United States Patent
Rampley et al.

(10) Patent No.: US 11,349,777 B2
(45) Date of Patent: May 31, 2022

(54) NETWORK QUALITY OF SERVICE CONTROLLER

(71) Applicant: Charter Communications Operating, LLC, St. Louis, MO (US)

(72) Inventors: Jim F. Rampley, Parker, CO (US); Thomas W. Dudley, IV, Castle Rock, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 124 days.

(21) Appl. No.: 16/685,743

(22) Filed: Nov. 15, 2019

(65) Prior Publication Data

US 2021/0152490 A1    May 20, 2021

(51) Int. Cl.
| | |
|---|---|
| *H04L 47/80* | (2022.01) |
| *H04L 47/20* | (2022.01) |
| *H04L 41/5019* | (2022.01) |
| *H04W 28/24* | (2009.01) |
| *H04L 47/24* | (2022.01) |

(52) U.S. Cl.
CPC ........ *H04L 47/805* (2013.01); *H04L 41/5019* (2013.01); *H04L 47/20* (2013.01); *H04L 47/24* (2013.01); *H04W 28/24* (2013.01)

(58) Field of Classification Search
CPC ... H04L 47/805; H04L 41/5019; H04L 47/20; H04L 47/24; H04W 28/24
See application file for complete search history.

(56) References Cited

U.S. PATENT DOCUMENTS

| | | | | |
|---|---|---|---|---|
| 6,816,903 | B1 * | 11/2004 | Rakoshitz | H04L 41/5003 370/230 |
| 6,975,638 | B1 * | 12/2005 | Chen | H04L 47/215 370/232 |
| 7,505,422 | B1 * | 3/2009 | Park | H04L 45/7453 370/256 |
| 7,792,963 | B2 | 9/2010 | Gould | |
| 9,160,797 | B2 * | 10/2015 | McDysan | H04L 67/04 |
| 9,998,355 | B2 * | 6/2018 | Callard | H04L 1/004 |
| 10,812,336 | B2 * | 10/2020 | Harneja | H04L 41/0873 |
| 10,855,604 | B2 * | 12/2020 | Tigli | H04L 47/193 |
| 2003/0032427 | A1 * | 2/2003 | Walsh | H04B 7/1858 455/428 |
| 2003/0056217 | A1 | 3/2003 | Brooks | |
| 2005/0025064 | A1 * | 2/2005 | Chang | H04L 41/0853 370/252 |
| 2005/0100000 | A1 * | 5/2005 | Faulkner | H04L 47/803 370/352 |
| 2006/0130107 | A1 | 6/2006 | Gonder et al. | |
| 2006/0176893 | A1 * | 8/2006 | Ku | H04L 49/90 370/412 |
| 2007/0217436 | A1 | 9/2007 | Markley | |

(Continued)

*Primary Examiner* — Shah M Rahman
(74) *Attorney, Agent, or Firm* — Otterstedt, Wallace & Kammer, LLP

(57) ABSTRACT

Apparatus, systems, and methods for managing a network. One or more network devices on a network and a QoS policy are periodically evaluated. A QoS operational status of the network is evaluated and a remediation action is implemented based on the evaluation of the QoS operational status of the network and the evaluation of the QoS policy, the remediation action comprising adjusting a bandwidth allocation for each of one or more queues.

21 Claims, 16 Drawing Sheets

(56) References Cited

U.S. PATENT DOCUMENTS

| | | | |
|---|---|---|---|
| 2008/0049614 A1* | 2/2008 | Briscoe | H04L 41/0806 370/230 |
| 2009/0248794 A1 | 10/2009 | Helms | |
| 2009/0279435 A1* | 11/2009 | Du | H04L 47/26 370/235 |
| 2010/0313236 A1 | 12/2010 | Straub | |
| 2011/0194426 A1* | 8/2011 | Fang | H04L 47/52 370/252 |
| 2011/0314145 A1* | 12/2011 | Raleigh | H04L 41/0893 709/224 |
| 2016/0380909 A1* | 12/2016 | Antony | H04L 49/70 370/236 |
| 2019/0098544 A1* | 3/2019 | Han | H04W 36/08 |
| 2019/0222522 A1* | 7/2019 | Shih | H04L 49/356 |
| 2020/0162503 A1* | 5/2020 | Shurtleff | H04L 41/0883 |

\* cited by examiner

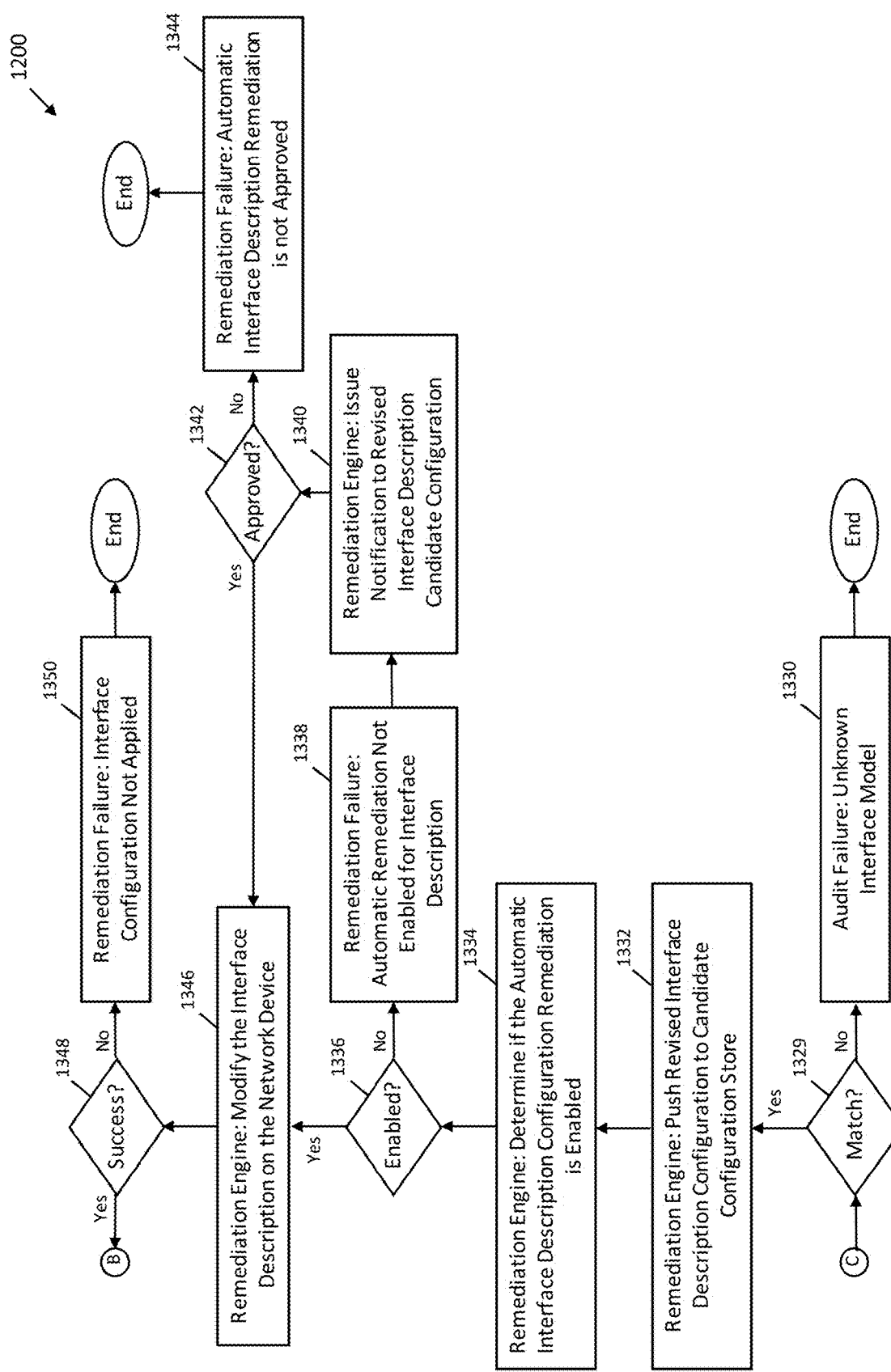

NETWORK QUALITY OF SERVICE CONTROLLER

FIELD OF THE INVENTION

The present invention relates generally to the electrical, electronic, and computer arts, and more particularly relates to the control of broadband networks.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville Colo. 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Provisioning, within a broadband network, includes the process of ensuring that customer premises equipment (CPE) such as cable modems, digital subscriber line (DSL) modems, and the like are properly configured, authenticated, successfully come online, and provide the proper quality of service. Defined quality of service (QoS) business rules may be used to determine if the network is operating properly and delivering the agreed upon quality of service. User intervention is often required, however, to remediate failures and to take corrective action to meet the defined QoS business tolerances and the like.

SUMMARY OF THE INVENTION

Techniques are provided for a network quality of service controller.

Generally, a closed loop automation, centralized network quality of service (QoS) controller is disclosed. In one example embodiment, the centralized network QoS controller includes a QoS audit engine, a QoS remediation engine, and a QoS analytics engine. The QoS audit engine periodically evaluates network elements, such as routers, interfaces, and the like, in the network to determine if the correct QoS policies have been applied. If the correct QoS policy is not applied to, for example, a given interface, the QoS audit engine will command the QoS remediation engine to automatically apply the correct QoS policy. Once a device has been approved by the QoS audit engine, the QoS analytics engine will continually use appropriate logic to evaluate the QoS operational health of the network, looking at the real-time interface QoS queue bandwidth utilization, queue drops, and the like. For example, queue drops are analyzed as they may or may not be normal depending on the traffic class and queue in question. When the QoS analytics engine finds the network is operating outside of the defined QoS business rules, it will command the QoS remediation engine to take corrective action to adjust the allocated QoS queue bandwidth, to adjust the queue depths on network interfaces not meeting the defined QoS business tolerances, adjust the aggressiveness of congestion avoidance mechanisms, such as drop profiles, and the like.

In one aspect, a system comprises a QoS audit engine, implemented using at least one hardware processor of one or more hardware processors, configured to periodically evaluate one or more network devices on a network and evaluate a QoS policy; a QoS analytics engine, implemented using at least one hardware processor of the one or more hardware processors, configured to evaluate a QoS operational status of the network; and a QoS remediation engine, implemented using at least one hardware processor of the one or more hardware processors, in data communication with the quality of service (QoS) audit engine and the quality of service (QoS) analytics engine, and configured to perform a remediation action based on the evaluation of the QoS operational status of the network and the evaluation of the QoS policy, the remediation action comprising adjusting a bandwidth allocation for each of one or more queues.

In one aspect, a method for managing a network comprises periodically evaluating one or more network devices on a network and evaluating a QoS policy; evaluating a QoS operational status of the network; and implementing a remediation action based on the evaluation of the QoS operational status of the network and the evaluation of the QoS policy, the remediation action comprising adjusting a bandwidth allocation for each of one or more queues.

In one aspect, a non-transitory computer readable medium comprises computer executable instructions which when executed by a computer cause the computer to perform the method of: periodically evaluating one or more network devices on a network and evaluating a QoS policy; evaluating a QoS operational status of the network; and implementing a remediation action based on the evaluation of the QoS operational status of the network and the evaluation of the QoS policy, the remediation action comprising adjusting a bandwidth allocation for each of one or more queues.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., an SDN controller) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module (s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide:

automatic network management auditing, analysis, and remediation;
automatic implementation of appropriate QoS policies on network devices;
ensuring increased network performance for critical services during periods of network impairment; and
avoiding potentially costly violations of service-level agreements.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 11A-11F are a flowchart for an example method for providing quality of service on a network, in accordance with an example embodiment.

DETAILED DESCRIPTION OF PREFERRED EMBODIMENTS

Figure 1:
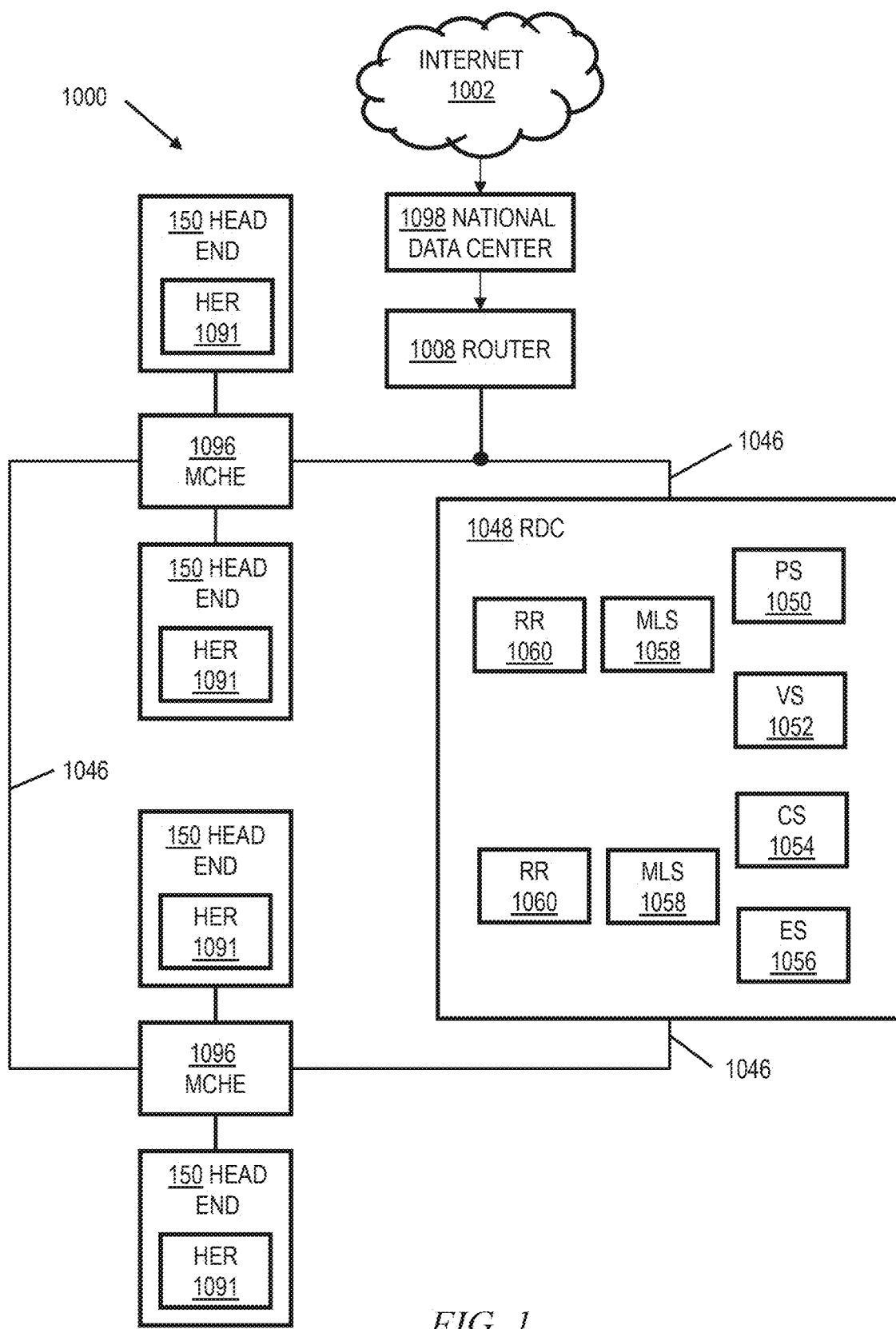
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, Calif., USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
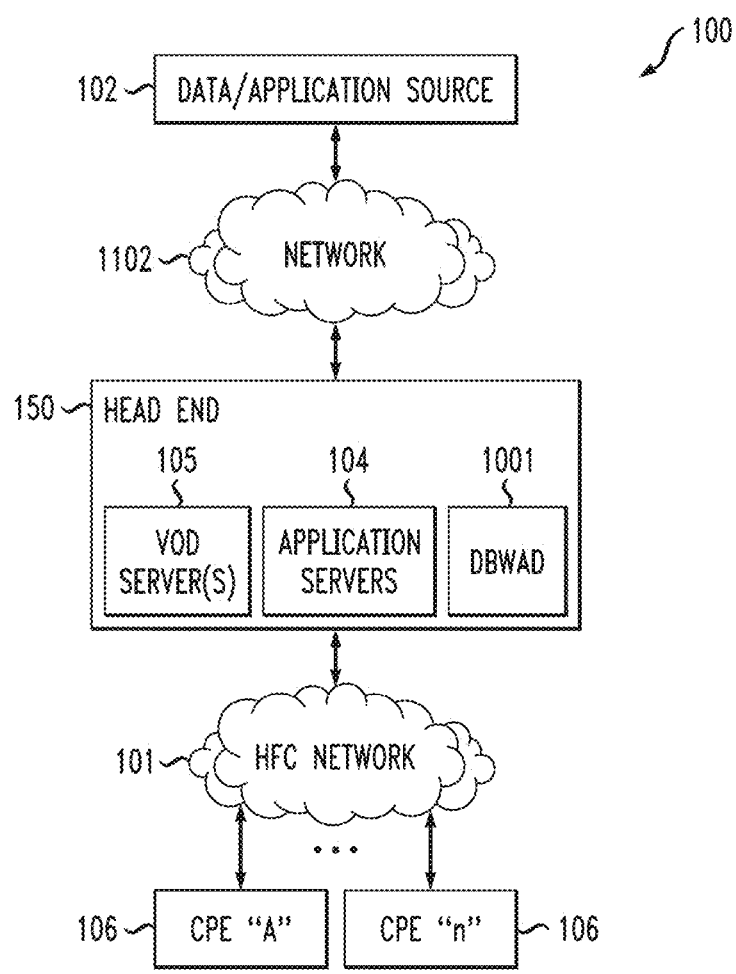
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
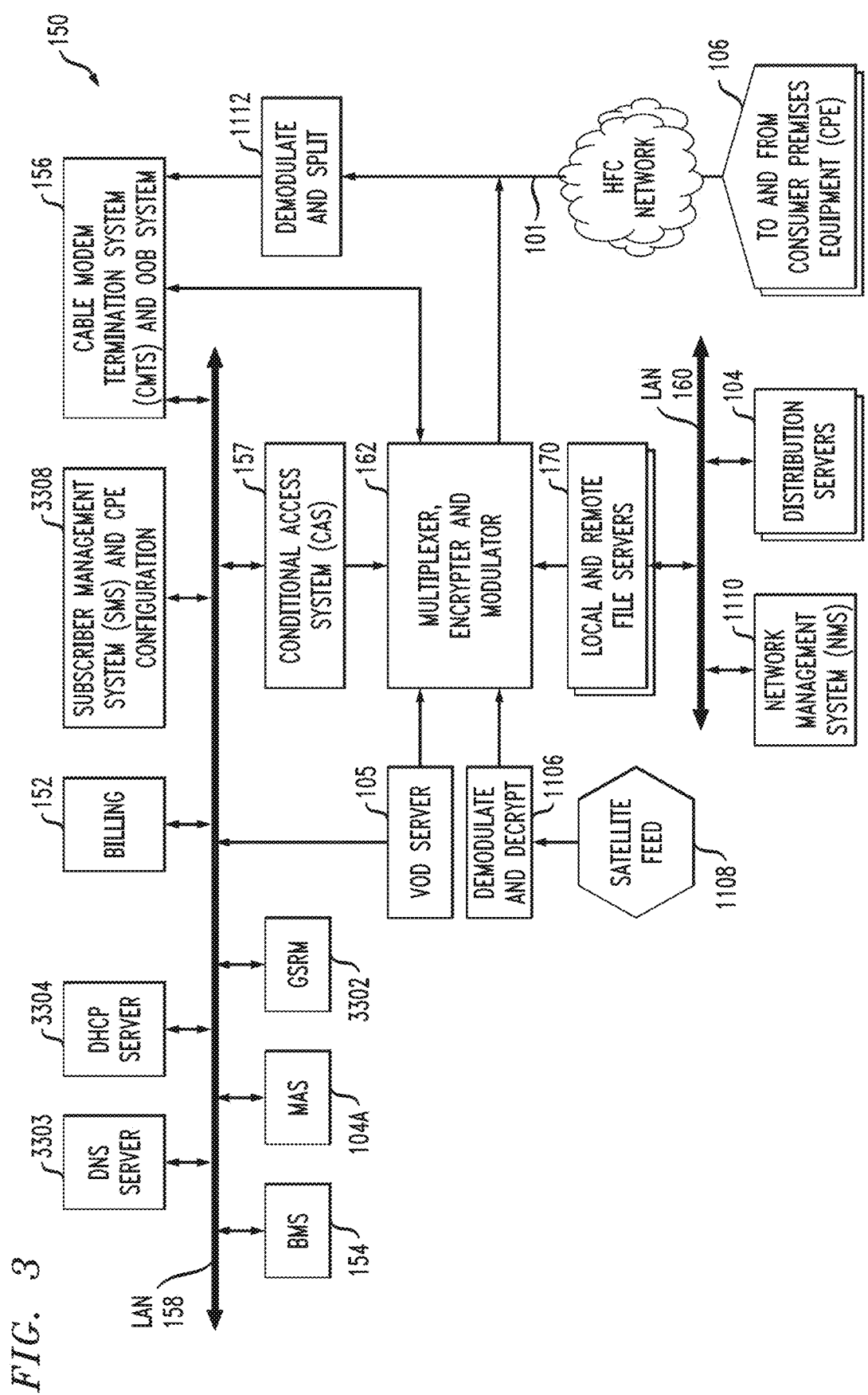
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville Colo. 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, Colo., USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
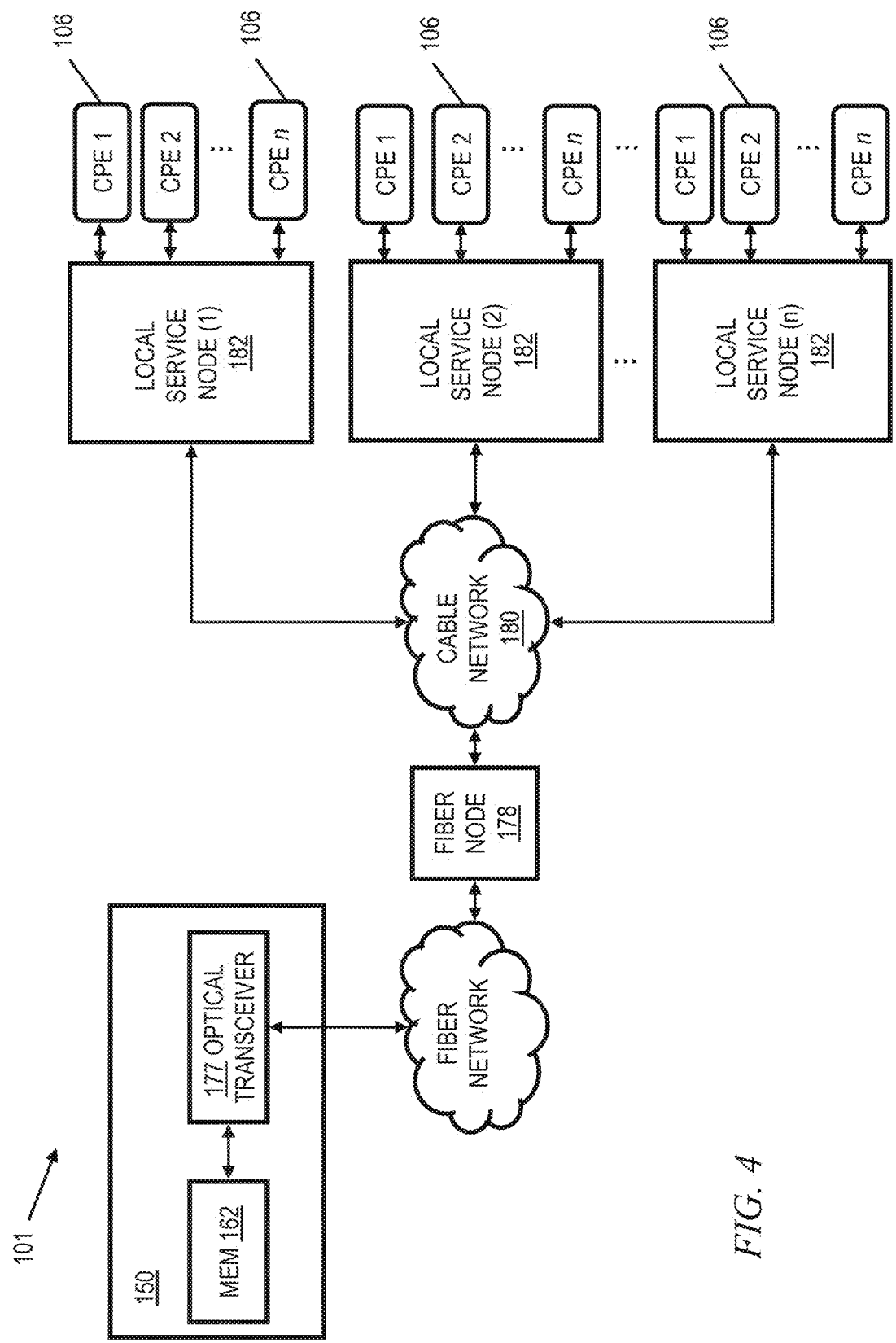
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
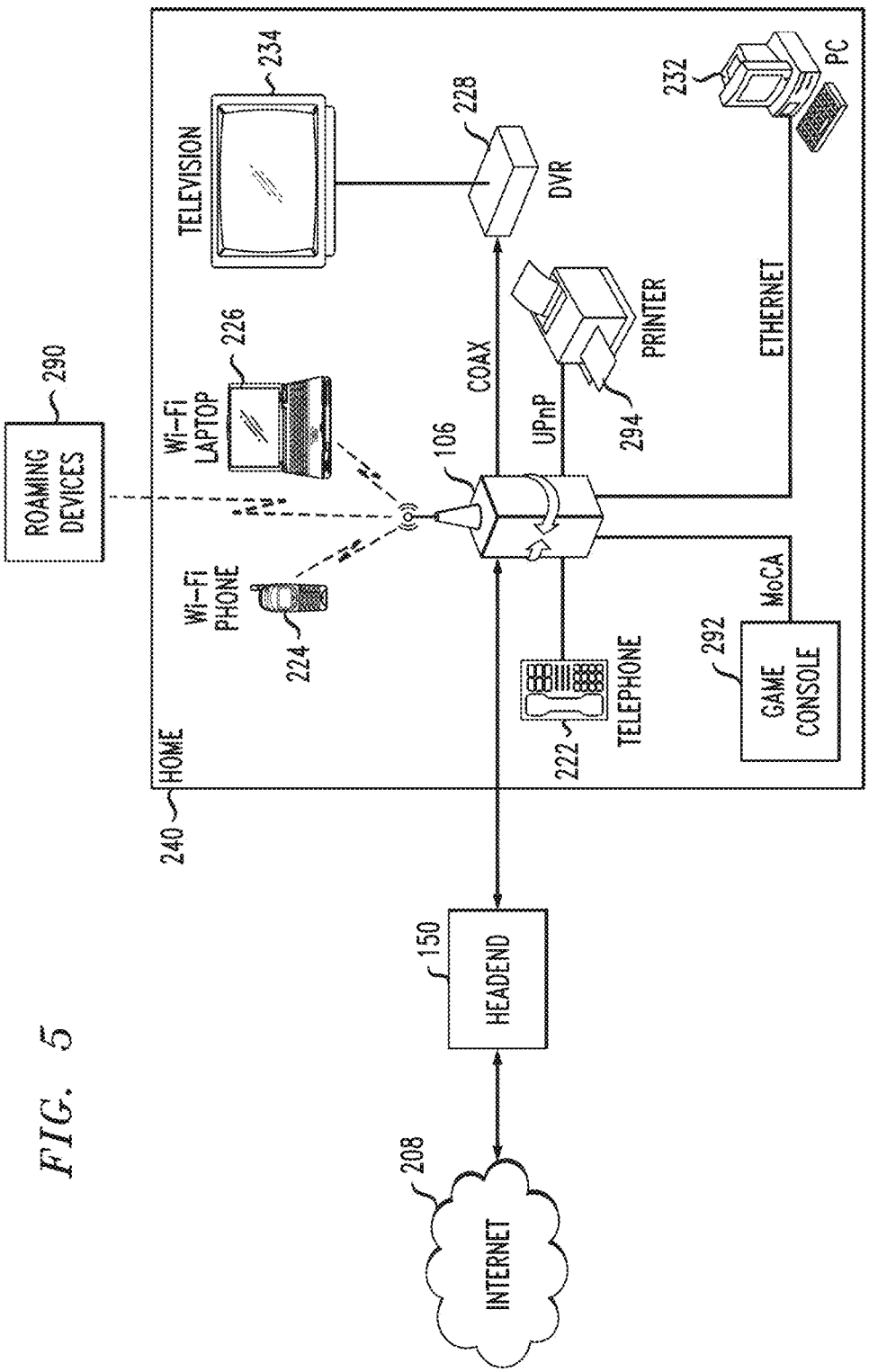
FIG. 5 is a functional block diagram of a premises network, including an exemplary centralized customer premises equipment (CPE) unit, interfacing with a head end such as that of FIG. 3.
Figure 6:
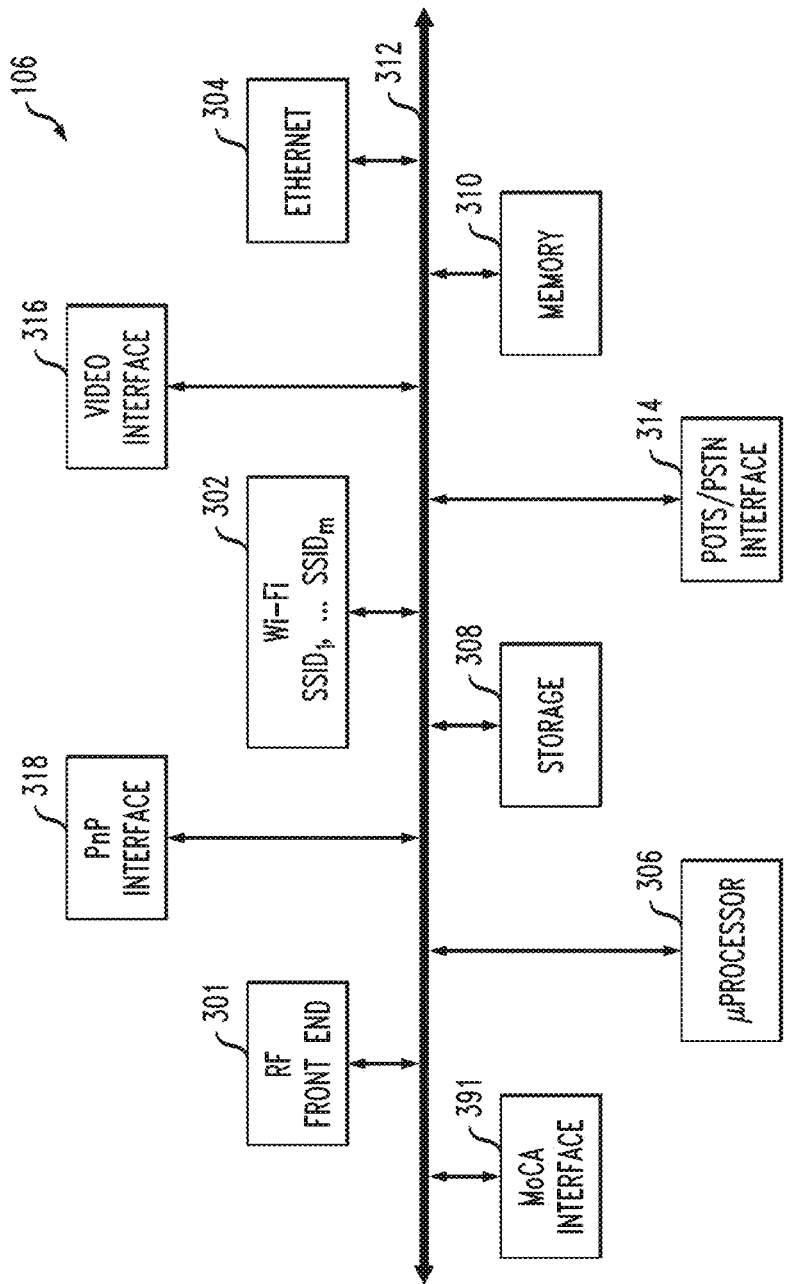
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
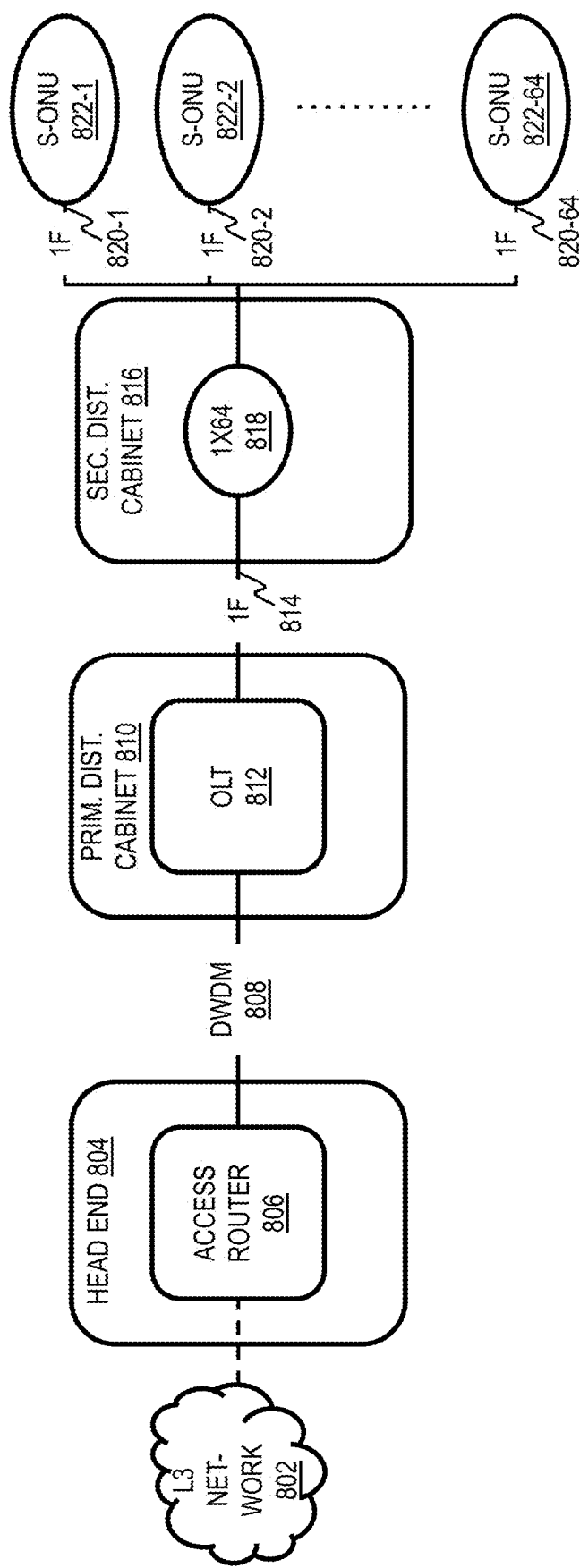
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
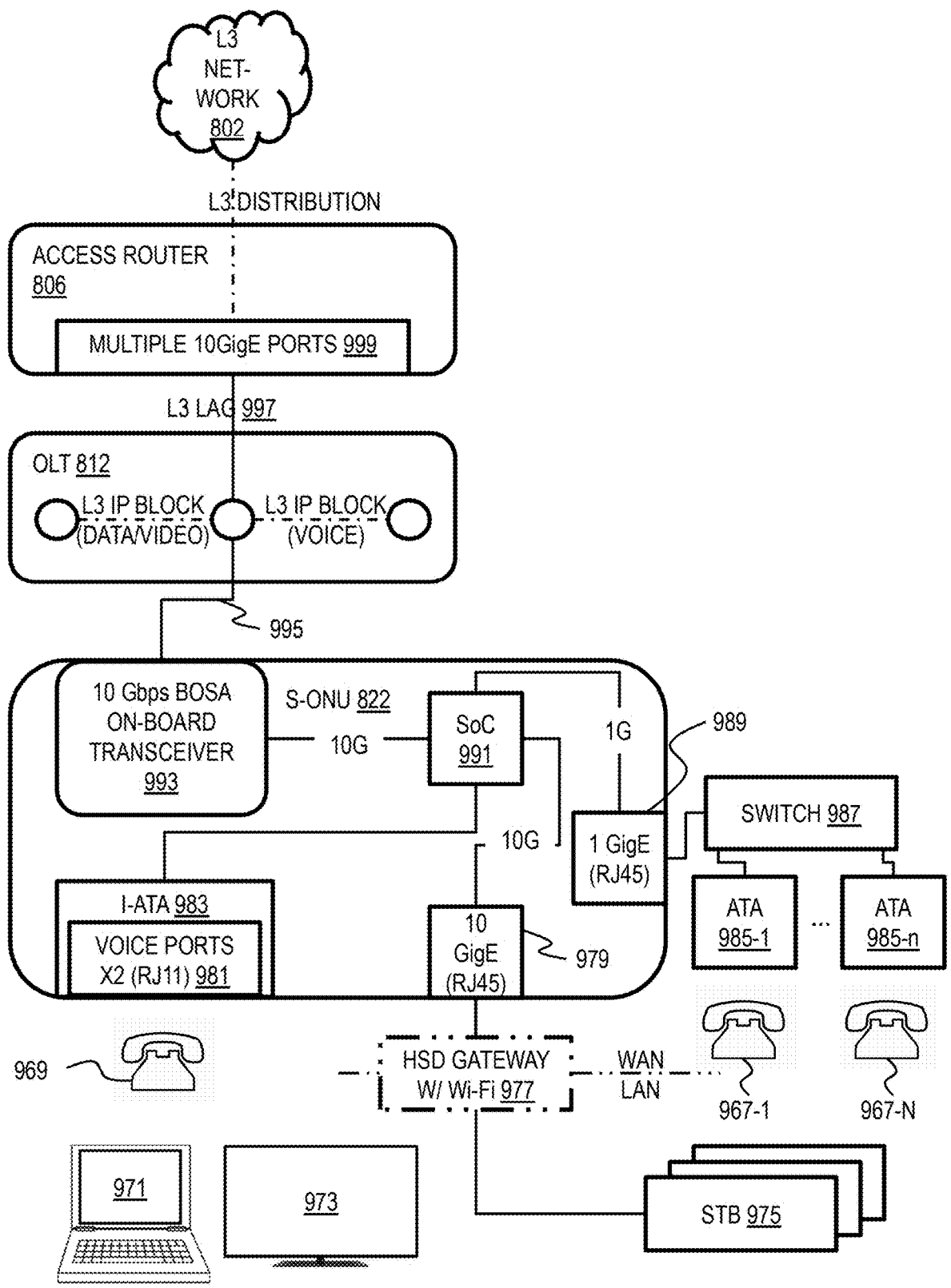
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 10:
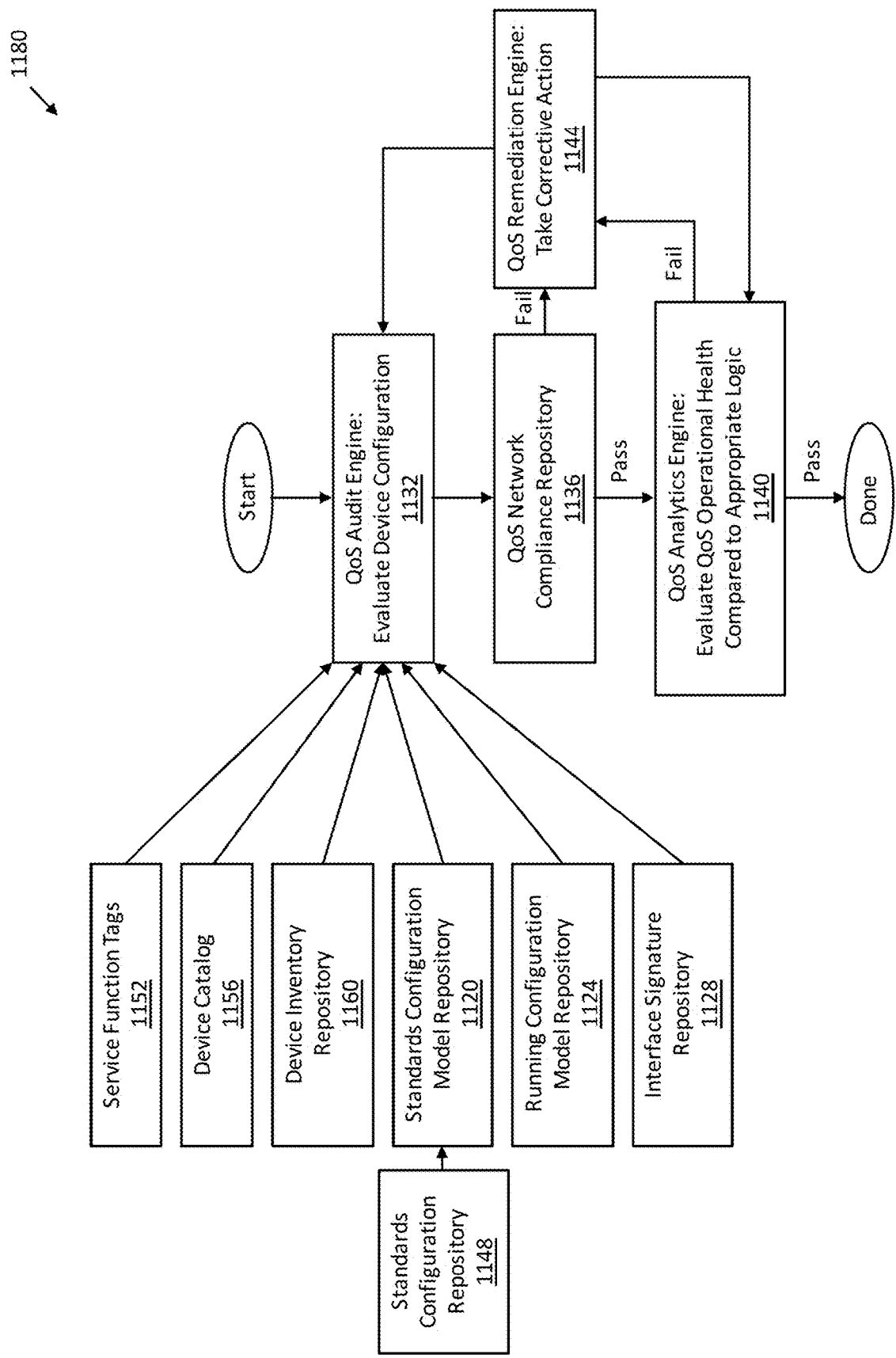
FIG. 10 is a block diagram of an example system for providing quality of service on a network, in accordance with an example embodiment.

FIG. 10 is a block diagram of an example system 1180 for providing quality of service on a network, in accordance with an example embodiment. In one example embodiment, the system 1180 includes a QoS audit engine 1132, a QoS remediation engine 1144, and a QoS analytics engine 1140.

The QoS audit engine 1132 periodically evaluates network elements, such as routers, interfaces, and the like, on a network to determine if the correct QoS policies have been applied. If the correct QoS policy is not applied to, for example, a given interface, the QoS audit engine 1132 will command the QoS remediation engine 1144 to automatically apply the correct QoS policy. Once a device has been approved by the QoS audit engine 1132, the QoS analytics engine 1140 will continually use appropriate logic to evaluate the QoS operational health of the network, looking at real-time interface QoS queue bandwidth utilization, queue drops, and the like. When the QoS analytics engine 1140 finds the network is currently operating outside of the defined QoS business rules, it will command the QoS remediation engine 1144 to take corrective action to adjust the allocated QoS queue bandwidth, to adjust the queue depths on network interfaces not meeting the defined QoS appropriate tolerances, and the like.

Service Function Tags

Service function tags 1152 are a list of agreed upon tags used on interface descriptions to properly identify connected services and devices. In one or more embodiments, a unique service function tag 1152 should be assigned to all connectivity occurrences where a unique QoS policy is required on an interface. Example interfaces requiring a unique service function tag 1152 are listed below:
CORE_TRUSTED
CORE_UNTRUSTED
EDGE_TRUSTED
EDGE_UNTRUSTED
SVC_RESIDENTIAL_INTERNET
SVC_COMMERCIAL_INTERNET
SVC_VOICE
SVC_VIDEO In one or more embodiments, every interface in the network has a description applied containing the correct service function tag 1152 defining the interface role in the network. Example service function tags include, but are not limited to:
CORE_TRUSTED
CORE_UNTRUSTED
EDGE_TRUSTED
EDGE_UNTRUSTED
SVC_RESIDENTIAL_INTERNET
SVC_COMMERCIAL_INTERNET
SVC_VOICE
SVC_VIDEO Device Catalog A device catalog 1156 is a repository with a complete list of device functions that clearly defines the roles of each network device, such as a router, and describes the approved platforms, line cards, software versions, approved connectivity types and services that are allowed to be connected to the device function that is represented by a given service function tag 1152.

Device Inventory Repository

A device inventory repository 1160 is the master inventory repository that warehouses the most up-to-date and accurate list of network devices. The device inventory repository 1160 has a complete inventory of each network device including line cards, software versions, and full running configuration. The device inventory repository preferably supports grouping of network devices by role type, vendor, platform, software version, region, and administrative responsibility.

Standards Configuration Repository

The approved standards configuration repository 1148 is the vendor and platform specific command-line interface (CLI) configuration template warehouse for each network device. All configurations in the standards configuration repository 1148 will have completed internal approval processes. As it pertains to the QoS controller, the standards configuration repository 1148 has all applicable QoS policies for all approved platforms for each device function. The standards configuration repository 1148 will also store the full interface configurations where QoS policies are applied. The standards configuration repository 1148 has a complete set of QoS polices for each device function where a unique service function tag 1152 is used within an interface description.

Standards Configuration Model Repository

The standards configuration model repository 1120 preferably uses YANG modeled abstractions of the standards configuration repository 1148. The standards configuration model repository 1120 may be part of the standards configuration repository 1148 or a standalone repository. The standards configuration model repository 1120 preferably stores standards-based configurations as YANG models in either eXtensible Markup Language (XML) or JavaScript Object Notation (JSON) object formats. As will be appreciated by the skilled artisan, YANG (Yet Another Next Generation) is a data modeling language for the definition of data sent over network management protocols such as the NETCONF and RESTCONF protocols.

```
YANG Example:
leaf host-name {
    type string;
    mandatory true;
    config true;
    description "Hostname for this system";
}
```

Legacy devices not supporting YANG models may use vendor native models or CLI formatted configurations.

Running Configuration Model Repository

The running configuration model repository 1124 is a modeled abstraction of the running configurations of devices currently in the network. The running configuration model repository 1124 preferably stores running configurations as YANG models in either XML or JSON object formats. The running configuration model repository 1124 will be extracted from network devices primarily via NETCONF, RESTCONF, or gRPC Remote Procedure Call (GRPC) using YANG data models or via platform CLI converted to a data model.

Example NETCONF XML Encoding

<host-name>my.example.com</host-name>

Interface Signature Repository

The interface signature repository 1128 contains data models that represent the configuration and operational state of all known interface connection types used throughout the network. The interface signature repository 1128 serves as a compliance validation tool to ensure that accurate service function tags 1152 are applied to all interfaces. The interface signature repository 1128 generates reports for missing or invalid service function tags 1152; these reports will be acted on by the QoS remediation engine. The signatures will be compared to, and contrasted against, the current configuration and operational data extracted from the network devices via NETCONF, RESTCONF, GRPC, or gRPC network management interface (GNMI) for every interface. Validation of interface configurations are not to rely on service function tags 1152 or interface descriptions alone; the role and relationships of devices on each end of a connection are to be confirmed through other operational data from protocols such as Link Layer Discovery Protocol, Interior Gateway Protocol (IGP) database (such as Open Shortest Path First (OSPF) or Intermediate System to Intermediate System (IS-IS)) or any other dynamically discovered source of truth.

Example NETCONF XML Encoding to validate neighbor:

```
<data>
    <interface-configurations xmlns="http://cisco.com/ns/yang/Cisco-IOS-XR-ifmgr-cfg">
        <interface-configuration>
            <active>act</active>
            <interface-name>Bundle-Ether1</interface-name>
            <interface-virtual></interface-virtual>
            <description>[TYPE=
CORE_TRUSTED][BW=20G][NAME=MY.EXAMPLE.COM][AS=65206][LAG=1][NBR_INT=BE1]</description>
        </interface-configuration>
    </interface-configurations>
</data>
```

Compare NAME=MY.EXAMPLE.COM with neighbor-sysid in the operational model below.

```
<ietf-isis xmlns="urn:ietf:params:xml:ns:yang:ietf-isis">
    <adjacency-state>
        <adjacencies>
            <adjacency>
                <neighbor-sysid/>
            </adjacency>
        </adjacencies>
    </adjacency-state>
</ietf-isis>
```

QoS Audit Engine

The QoS audit engine 1132 includes an automation framework that will use the device inventory repository 1160 to evaluate network compliance. After the process starts, the QoS audit engine 1132 uses the device catalog 1156 to determine if a given device meets minimum hardware and software requirements. The QoS audit engine 1132 has logic to determine an interface's role based on the service function tag 1152 field of the interface description. For example, given a CORE_TRUSTED service function tag, the network device would be recognized as a trusted device under administrative control connected to this interface. The QoS audit engine 1132 uses the interface signature repository 1128 to verify that the service function tag 1152 is accurate or to determine the role of a mislabeled interface. The QoS audit engine 1132 commands the QoS remediation engine 1144 to automatically correct a missing or mislabeled service function tag 1152 field of the interface descriptions. The QoS audit engine 1132 will evaluate an interface with a known service function tag 1152 against the device catalog 1156 and device inventory repository 1160 to ensure that approved hardware and/or software are used for a given service function, then compares the running configuration model repository 1124 against the standards configuration model repository 1120 to ensure that the correct QoS policy is applied for a given service function tag 1152. If the correct QoS policy is not applied, the QoS audit engine 1132 commands the QoS remediation engine 1144 to apply the correct QoS policy. Once the QoS audit engine 1132 has passed a given device and interface for having a proper QoS configuration applied, the device and interface will be marked as "pass" in the QoS network compliance repository 1136; from the "pass" branch of the QoS network compliance repository 1136, logical flow proceeds to the QoS analytics engine 1140. In case of a "fail," corrective action is taken by engine 1144 via the "fail" branch of the QoS network compliance repository 1136, as described herein.

QoS Network Compliance Repository

The QoS network compliance repository 1136 serves as a central repository for the network, listing all network devices and subcomponents, such as interfaces tracking current and historical compliance. The QoS network compliance repository 1136 is maintained by the QoS audit engine 1132.

QoS Remediation Engine

The QoS remediation engine 1144 is driven by the QoS audit engine 1132 and QoS analytics engine 1140 to configure network devices with proper service function tags 1152 and QoS configurations defined by design standards and appropriate logic. The QoS remediation engine 1144 will deploy configurations to network devices using any supported method such as NETCONF, RESTCONF, GRPC, GNMI, and the like.

QoS Analytics Engine

The QoS analytics engine 1140 will ingest traffic statistics from network devices using various methods such as Streaming Telemetry, NetFlow/JFLOW/IPFIX (IP flow information export), SNMP (simple network management protocol), and the like. The QoS analytics engine 1140 provides visualization for traffic classification, interface queue utilization, and drops, and generates reports for non-standard traffic classes, over utilization of queues, and queue drops. If QoS configuration adjustments are required ("fail" branch from 1140), the QoS analytics engine 1140 will command the QoS remediation engine 1144 to adjust QoS configurations, as necessary, to align with desired traffic performance based on appropriate logic; otherwise ("pass" from 1140) branch, the flow is complete for the time being.

Figure 11A:
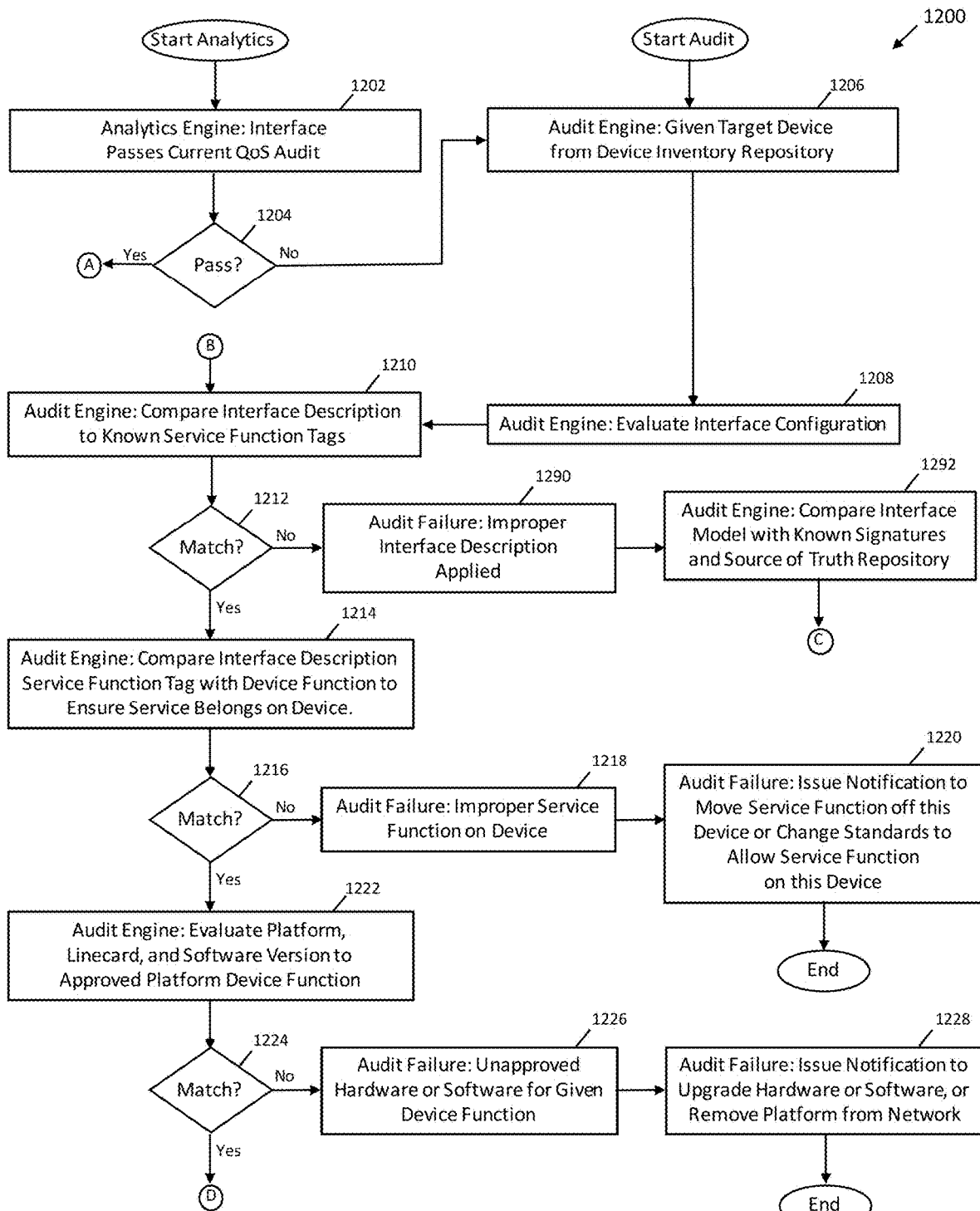
Figure 11B:
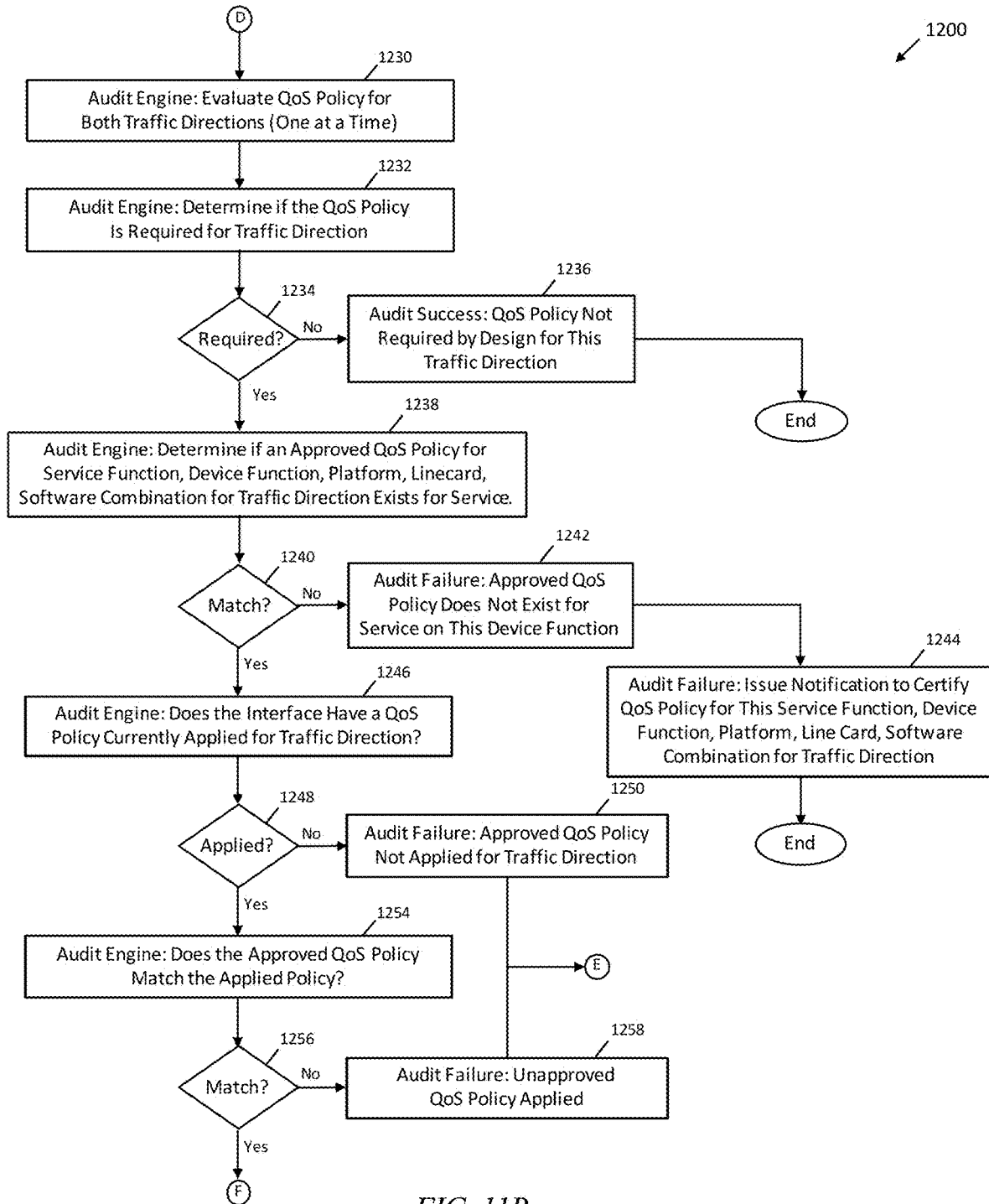
Figure 11C:
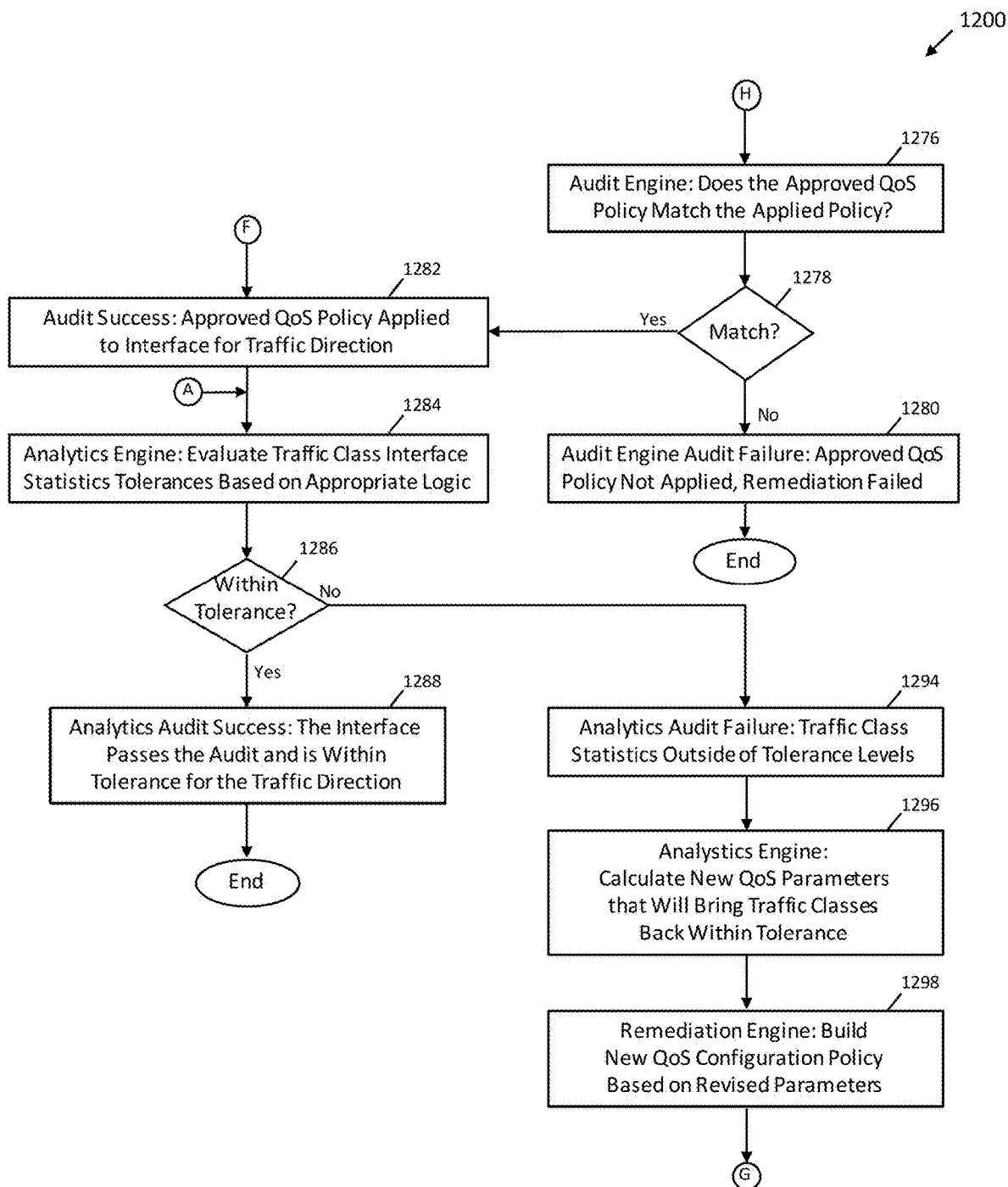
Figure 11D:
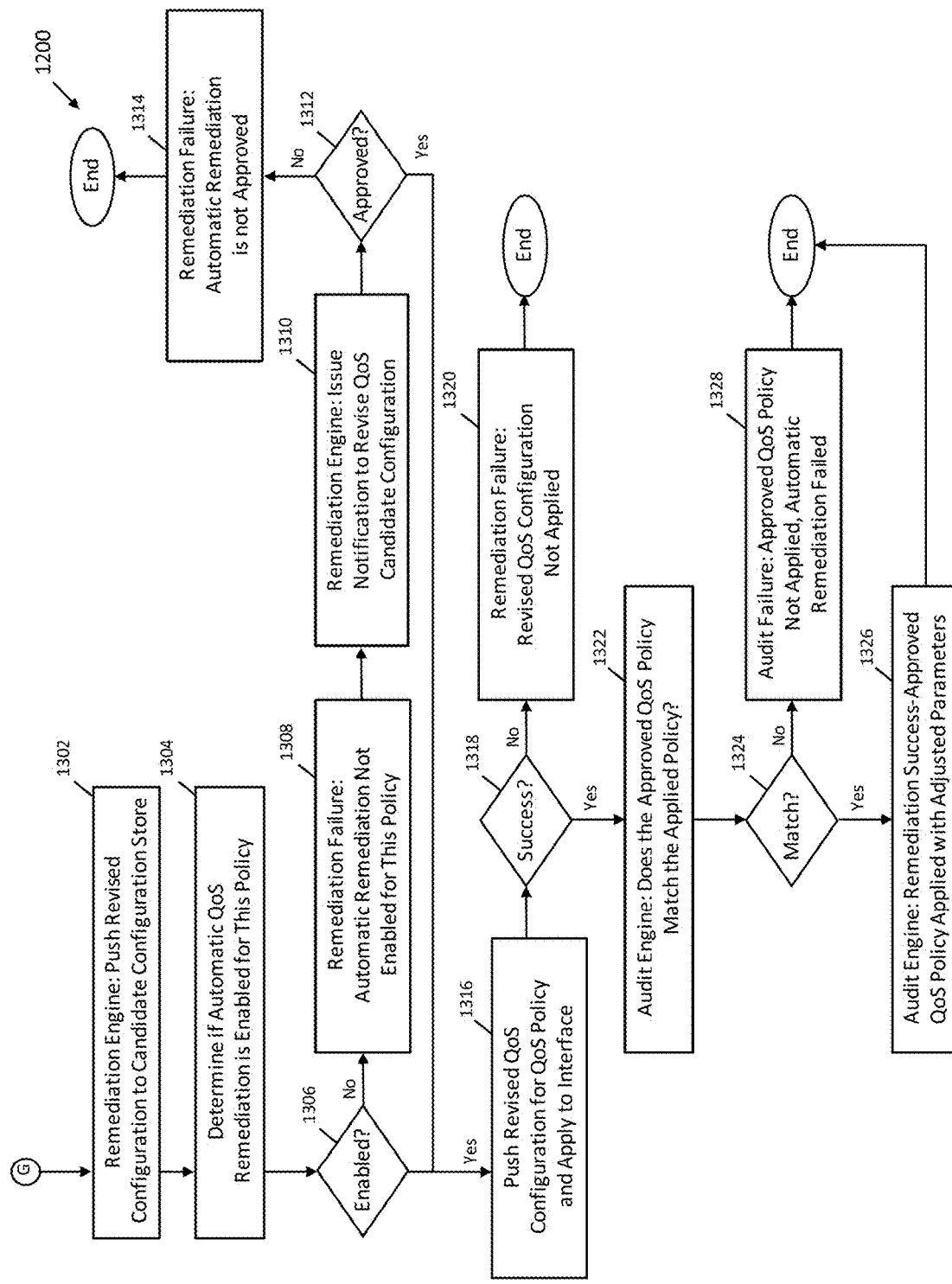

FIGS. 11A-11F are a flowchart for an example method 1200 for providing quality of service on a network, in accordance with an example embodiment. In one example embodiment, analytics are performed to determine if a selected interface passes a QoS audit (operation 1202). For example, the analytics engine 1140 may analyze results from the audit engine 1132. If the interface passes the QoS audit (as determined at decision block 1204, YES branch), the method 1200 proceeds with operation 1284 (FIG. 11C via connector A). If the interface does not pass the QoS audit (as determined at decision block 1204, NO branch), information regarding the given target device is obtained from the device inventory repository 1160 (operation 1206) and the interface configuration(s) of the given target device are evaluated (operation 1208). The interface description is compared to known service function tags 1152 (operation 1210). If any interface description of a target device is incompatible with a known service function tag 1152 (as determined at decision block 1212, NO branch), the method 1200 proceeds with operation 1290 (as described more fully below). If all interface descriptions of the target device are compatible with a known service function tag 1152 (as determined at decision block 1212), the interface description service function tag 1152 is compared with the corresponding device function to ensure that the service belongs on the network device (operation 1214 via YES branch of 1212). If the service function is not an appropriate service function on the network device (as determined at decision block 1216), an audit failure is identified (improper service function on the network device; operation 1218 via NO branch of 1216), a notification is issued to move the service function off the device (such as a router) or to change the standard(s) to allow the service function on the device (operation 1220), and the method 1200 ends.

Returning to operation 1222 (reached by YES branch of 1216), if the service function is not an appropriate service function on the network device (as determined at decision block 1216), the platform, linecard, and software version are evaluated in terms of the approved platform device functions. If unapproved hardware and/or software for the given device function is discovered (no match with the approved platform device function, as determined at decision block 1224), an audit failure is identified (unapproved hardware and/or software for the given device function; operation 1226 via NO branch of 1224), a notification is issued to upgrade the hardware and/or software or to remove the platform from the network (operation 1228), and the method 1200 ends.

If unapproved hardware and/or software for the given device function is not discovered (a match with the approved platform device function is discovered, as determined at decision block 1224), the QoS policy is evaluated for each traffic direction (one direction at a time; operation 1230 on FIG. 11B via connector D from YES branch of 1224) and a determination is made of whether the QoS policy is required for the corresponding traffic direction (operation 1232). If the QoS policy is not required for the corresponding direction (as determined at decision block 1234), an audit success is identified (QoS policy is not required by design for the corresponding traffic direction; operation 1236 via NO branch of 1234) and the method 1200 ends.

If the QoS policy is required for the corresponding direction (as determined at decision block 1234, YES branch), a determination is made of whether an approved QoS policy for service function, device function, platform, linecard, and the software combination for the traffic direction exists for service on the network device (operation 1238 via YES branch of 1234). If an approved QoS policy is not discovered (as determined at decision block 1240), an audit failure is identified (approved QoS policy does not exist for the service on this network device; operation 1242 via NO branch of 1240), a notification is issued to request certification of the QoS policy for this service function, device function, platform, linecard, and the software combination for the traffic direction (operation 1244), and the method 1200 ends.

If the QoS policy is approved for the corresponding direction (as determined at decision block 1240, YES branch), the interface is evaluated to determine whether the approved QoS policy is currently applied for the specified traffic direction (operation 1246). If the approved QoS policy is not currently applied (as determined at decision block 1248, NO branch), an audit failure is identified (approved QoS policy is not currently applied for the specified traffic direction; operation 1250 via NO branch of 1248) and the method 1220 proceeds with operation 1352 on FIG. 11F via connector E.

If a QoS policy is currently applied (as determined at decision block 1248, YES branch), a determination is made of whether the approved QoS policy matches the applied policy (operation 1254). If the approved QoS policy does not match the applied policy (as determined at decision block 1256, NO branch), an audit failure is identified (an unapproved QoS policy is applied; operation 1258) and the method 1200 proceeds with operation 1352 on FIG. 11F via connector E. If the approved QoS policy matches the applied policy (as determined at decision block 1256, YES branch) or the approved QoS policy matches the applied policy (as determined at decision block 1278 in FIG. 11C, which is discussed further elsewhere herein), an audit success is identified (the approved QoS policy is applied to the interface for the given traffic direction; operation 1282 on FIG. 11C via connector F from YES branch of 1256 or 1278) and the traffic class interface statistics tolerances are evaluated based on appropriate logic (operation 1284).

If the traffic class interface statistics are within tolerances (as determined at decision block 1286, YES branch), an analytics audit success is identified (the interface passes the audit and is within tolerances for the specified traffic direction; operation 1288 via YES branch of 1286) and the method 1200 ends. If the traffic class interface statistics are not within tolerances (as determined at decision block 1286, NO branch), an analytics audit failure is identified (the interface fails the audit and is not within tolerances for the specified traffic direction; operation 1294 via NO branch of 1286), new QoS parameters (such as bandwidth allocation) that will bring the traffic classes back within tolerance are calculated (operation 1296), a new QoS configuration/policy is built based on revised parameters (operation 1298), and the method 1200 proceeds with operation 1302 on FIG. 11D via connector G.

During operation 1302, the revised configuration is pushed to the candidate configuration store and a determination is then made of whether the automatic QoS remediation is enabled for this policy (operation 1304). If the automatic QoS remediation is not enabled for this policy (as determined at decision block 1306, NO branch), a remediation failure is identified (automatic QoS remediation is not enabled for this policy; operation 1308 via NO branch of 1306) and a notification is issued to revise the QoS candidate configuration (operation 1310).

A determination is then made of whether the automatic remediation is approved (operation 1312). If the automatic remediation is not approved (as determined at decision block 1312, NO branch), a remediation failure is identified (the automatic remediation is not approved; operation 1314 via NO branch of 1312) and the method 1200 ends.

If the automatic remediation is approved (as determined at decision block 1312, YES branch) or the automatic QoS remediation is enabled for this policy (as determined at decision block 1306, YES branch), the revised QoS configuration for the QoS policy is pushed and applied to the interface (operation 1316 via YES branch of 1306) and a determination is made of whether the revision and application was successful (operation 1318). If the revision and application was not successful (as determined at decision block 1318, NO branch), a remediation failure is identified (the revision and application was not successful; operation 1320 via NO branch of 1318) and the method 1200 ends. If the revision and application was successful (as determined at decision block 1318, YES branch), a determination is made of whether the approved quality of service policy matches the applied policy (operation 1322).

If the approved quality of service policy does not match the applied policy (as determined at decision block 1324, NO branch), an audit failure (an approved QoS policy is not applied; automatic remediation failed) is identified (operation 1328 via NO branch of 1324) and the method 1200 ends. If the approved quality of service policy matches the applied policy (as determined at decision block 1324, YES branch), a remediation success (approved QoS policy applied with adjusted queue depth) is identified (operation 1326 via YES branch of 1324) and the method 1200 ends.

Returning to operation 1290 in FIG. 11A (reached via the NO branch of block 1212), an audit failure (improper interface description applied) is identified, the interface model is compared with known signatures and source of truth repository (operation 1292). If the interface model does not match known signatures and source of truth repository (as determined at decision block 1329 on FIG. 11E via connector C), an audit failure is identified (unknown interface model; operation 1330 via NO branch of 1329) and the method 1200 ends.

If the interface model matches known signatures and the source of truth repository (as determined at decision block 1329, YES branch), an audit success is identified and the revised interface description configuration is pushed to the candidate configuration store (operation 1332 via YES branch of 1329). A determination is made of whether the automatic interface description configuration remediation is enabled (operation 1334).

If the automatic interface description configuration remediation is not enabled (as determined at decision block 1336, NO branch), a remediation failure is identified (automatic remediation is not enabled for the interface description; operation 1338 via NO branch of 1336) and a notification is issued to revise the interface description candidate configuration (operation 1340). A determination is then made of whether the automatic interface description remediation is approved.

If the automatic interface description remediation is not approved (as determined at decision block 1342, NO branch), a remediation failure is identified (the automatic interface description remediation is not approved; operation 1344 via NO branch of 1342) and the method 1200 ends. If the automatic interface description remediation is approved (as determined at decision block 1342, YES branch) or if the automatic interface description configuration remediation is enabled (as determined at decision block 1336, YES branch), the remediation engine will modify the interface description on the network device (operation 1346) and a determination is made of whether the push was successful. If the push was not successful (as determined at decision block 1348, NO branch), a remediation failure is identified (the push was not successful, the interface configuration is not applied; operation 1350 via NO branch of 1348) and the method 1200 ends. If the push was successful (as determined at decision block 1348, YES branch), the method 1200 proceeds with operation 1210 on FIG. 11A via connector B.

Figure 11F:
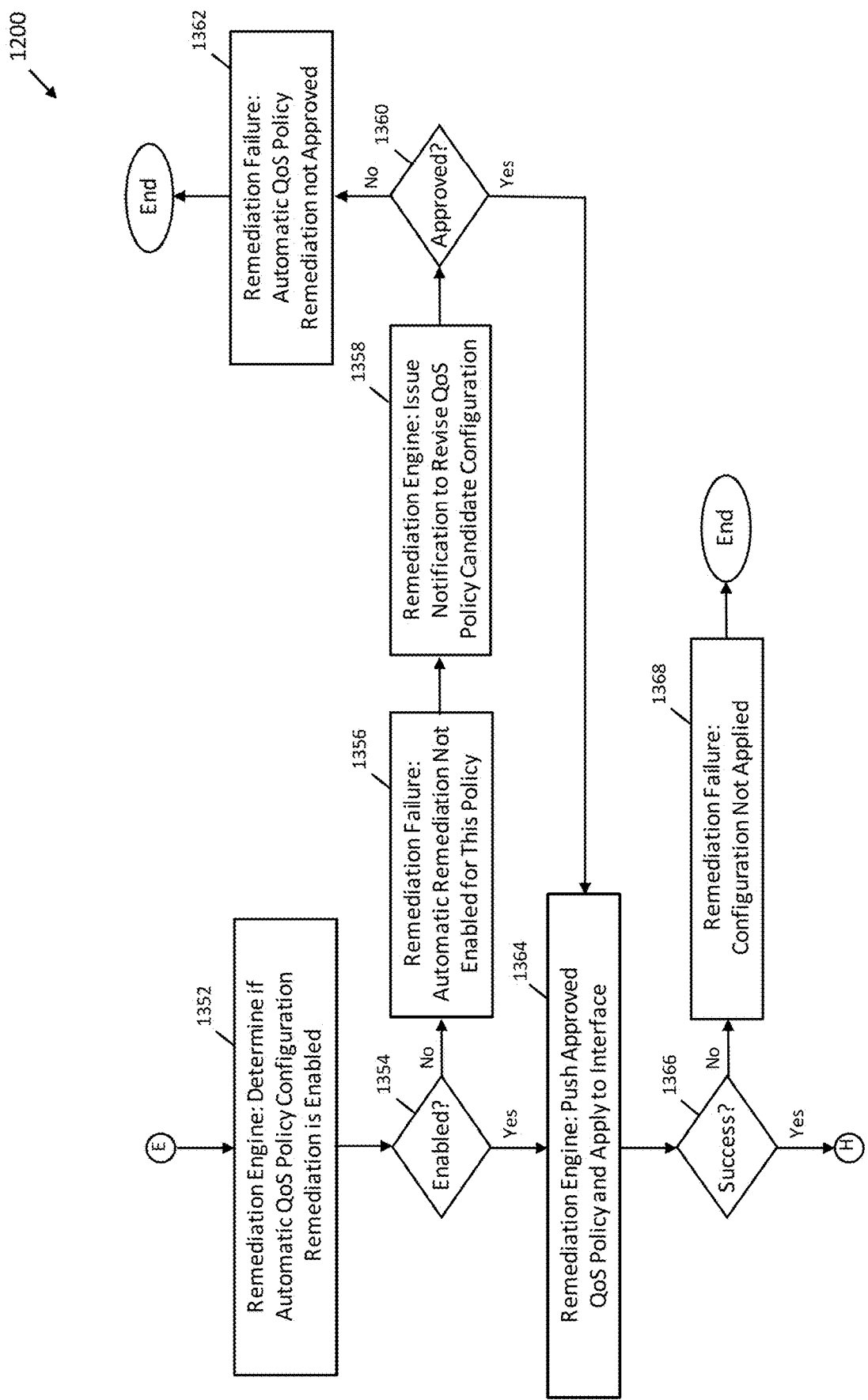

During operation 1352 in FIG. 11F, a determination is made of whether an automatic quality of service policy configuration remediation is enabled. If an automatic quality of service policy configuration remediation is not enabled for this policy (as determined at decision block 1354, NO branch), a remediation failure is identified (an automatic quality of service policy configuration remediation is not enabled; operation 1356 via NO branch of 1354), a notification is issued to revise the QoS policy candidate configuration (1358) and a determination is made of whether the automatic QoS policy remediation approved. If the automatic QoS policy remediation was not approved (as determined at decision block 1360, NO branch), a remediation failure is identified (automatic QoS policy remediation was not approved; operation 1362 via NO branch of 1360) and the method 1200 ends. If the automatic QoS policy remediation was approved (as determined at decision block 1360, YES branch) or automatic quality of service policy configuration remediation is enabled for this policy (as determined at decision block 1354, YES branch), the approved QoS policy is pushed to the interface and applied (operation 1364). If the application of the approved QoS policy is not successful (as determined at decision block 1366, NO branch), a remediation failure is identified (configuration not applied; operation 1368 via NO branch of 1366) and the method 1200 ends. If the application of the approved QoS policy is successful (as determined at decision block 1366 YES branch), a determination is made of whether the approved QoS policy matches the applied policy (operation 1276 on FIG. 11C via connector H).

If the approved QoS policy does not match the applied policy (as determined at decision block 1278 in FIG. 11C, NO branch), an audit failure is identified (approved QoS policy not applied, remediation failure; operation 1280) and the method 1200 ends. If the approved QoS policy matches the applied policy (as determined at decision block 1278, YES branch), the method 1200 proceeds with operation 1282.

Recapitulation

Given the discussion thus far, it will be appreciated that, in general terms, an exemplary method, according to an aspect of the invention, includes the operations of periodically evaluating one or more network devices on a network 1214, 1216, 1222 and evaluating a QoS policy 1230; evaluating a QoS operational status of the network 1284; and implementing a remediation action based on the evaluation of the QoS operational status of the network and the evaluation of the QoS policy, the remediation action comprising adjusting a bandwidth allocation for each of one or more queues 1296.

In one example embodiment, a system comprises a QoS audit engine 1132, implemented using at least one hardware processor of one or more hardware processors, configured to periodically evaluate one or more network devices on a network 1214, 1216, 1222 and evaluate a QoS policy 1230; a QoS analytics engine 1140, implemented using at least one hardware processor of the one or more hardware processors, configured to evaluate a QoS operational status of the network 1284; and a QoS remediation engine 1144, implemented using at least one hardware processor of the one or more hardware processors, in data communication with the quality of service (QoS) audit engine and the quality of service (QoS) analytics engine, and configured to perform a remediation action based on the evaluation of the QoS operational status of the network and the evaluation of the QoS policy, the remediation action comprising adjusting a bandwidth allocation for each of one or more queues 1296.

In one example embodiment, the QoS operational status is evaluated based on appropriate logic and appropriate rules 1284. In one example embodiment, the QoS operational status is evaluated by analyzing a real-time interface QoS queue bandwidth utilization and one or more queue drops. In one example embodiment, the remediation action adjusts an allocated QoS policy 1298, a queue depth on a network interface 1316, or both. In one example embodiment, the evaluation of the QoS operational status and the performance of the remediation action are iteratively performed to optimize a performance of the network and maintain the network within specified operating parameters. In one example embodiment, the evaluation of the QoS operational status and the performance of the remediation action are iteratively performed to detect and remediate a network anomaly, a QoS issue, or both.

In one example embodiment, the QoS audit engine, the QoS analytics engine, and QoS remediation engine are centrally located in a national data center 1098. In another aspect, the Quality of service (QoS) audit engine, the Quality of service (QoS) analytics engine, and Quality of service (QoS) remediation engine are implemented in a disaggregated manner in one or more regional data centers 1028. In general, the engines can, but need not, share a physical machine and/or a virtual machine implemented via a hypervisor. Storage can be separate in one or more embodiments. In or more embodiments, monitoring is continuous, and aspects of the invention can fix a detected QoS problem and/or prevent a QoS violation.

In one example embodiment, the QoS analytics engine is further configured to evaluate traffic class interface statistics tolerances 1284 and calculate new QoS parameters in response to the traffic class interface statistics violating specified tolerances 1296. In one example embodiment, the QoS remediation engine is further configured to build a new QoS configuration policy based on revised parameters 1298, apply a revised QoS configuration to a corresponding interface 1316, and apply an approved QoS policy to a corresponding interface 1364. In one example embodiment, the QoS audit engine 1132 is further configured to evaluate an interface configuration 1208, compare an interface description to one or more service function tags 1210, evaluate a QoS policy for each traffic direction 1246, and determine if an approved QoS policy matches an applied QoS policy 1276, 1278.

In one example embodiment, a QoS remediation engine is commanded to take corrective action in response to a QoS analytics engine 1140 determining the network is operating in violation of one or more defined QoS rules. In one example embodiment, the QoS operational status is evaluated by analyzing a real-time interface QoS queue bandwidth utilization and one or more queue drops. In one example embodiment, the evaluation of the QoS operational status and the performance of the remediation action are iteratively performed to optimize a performance of the network and maintain the network within specified operating parameters.

In one example embodiment, the evaluation of the QoS operational status and the performance of the remediation action are iteratively performed to detect and remediate a network anomaly, a QoS issue, or both. In one example embodiment, traffic class interface statistics tolerances are evaluated 1284 and new QoS parameters are calculated in response to the traffic class interface statistics violating specified tolerances 1296. In one example embodiment, a new QoS configuration policy is built based on revised parameters 1298, a revised QoS configuration is applied to a corresponding interface 1316, and an approved QoS policy is applied to a corresponding interface 1364.

In one example embodiment, a non-transitory computer readable medium comprises computer executable instructions which when executed by a computer cause the computer to perform the method of: periodically evaluating one or more network devices on a network 1216/1222 and evaluating a QoS policy 1230; evaluating a QoS operational status of the network 1284; and implementing a remediation action based on the evaluation of the QoS operational status of the network and the evaluation of the QoS policy, the remediation action comprising adjusting a bandwidth allocation for each of one or more queues 1296.

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
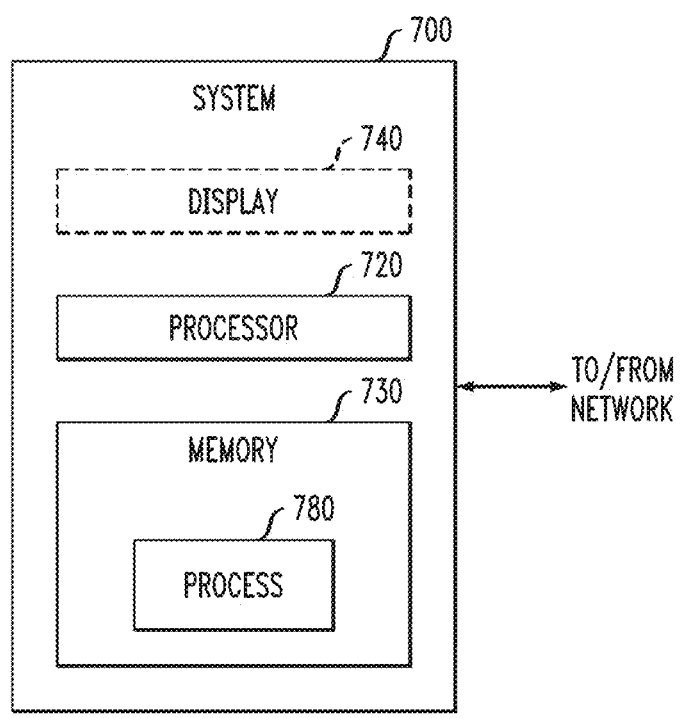
FIG. 7 is a block diagram of a computer system useful in connection with one or more aspects of the invention.

FIG. 7 is a block diagram of a system 700 that can implement at least some aspects of the invention, and is representative, for example, of one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on a virtualized or non-virtualized hardware server implementing one or more of the collector module 1054, the configuration/operational data (COD) collector module 1058, the correlation logic module 1062, and the graphical user interface module 1066, and that such program may be embodied on a tangible computer readable recordable storage medium. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures (e.g. modules/sub-modules to implement the collector module 1054, the configuration/operational data (COD) collector module 1058, the correlation logic module 1062, and the graphical user interface module 1066. The method steps can then be carried out using the distinct software modules of the system, as described above, executing on one or more hardware processors (e.g., a hardware processor or server located in the regional data center 1048 and/or national data center 1098). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system comprising:
   a quality of service (QoS) audit engine, implemented using at least one hardware processor of one or more hardware processors, configured to periodically evaluate one or more network devices on a network and evaluate a quality of service (QoS) policy;
   a quality of service (QoS) analytics engine, implemented using at least one hardware processor of the one or more hardware processors, configured to evaluate a quality of service (QoS) operational status of the network; and
   a quality of service (QoS) remediation engine, implemented using at least one hardware processor of the one or more hardware processors, in data communication with the quality of service (QoS) audit engine and the quality of service (QoS) analytics engine, and configured to automatically perform a remediation action based on the evaluation of the quality of service (QoS) operational status of the network and the evaluation of the quality of service (QoS) policy, the remediation action comprising adjusting a bandwidth allocation and a queue depth for each of a plurality of queues in response to a change in the evaluation of the quality of service (QoS) operational status of the network.

2. The system of claim 1, wherein the Quality of service (QoS) operational status is evaluated based on appropriate logic and appropriate rules.

3. The system of claim 1, wherein the Quality of service (QoS) operational status is evaluated by analyzing a real-time interface Quality of service (QoS) queue bandwidth utilization and one or more queue drops.

4. The system of claim 1, wherein the remediation action adjusts an allocated Quality of service (QoS) policy.

5. The system of claim 1, wherein the evaluation of the Quality of service (QoS) operational status and the performance of the remediation action are iteratively performed to optimize a performance of the network and maintain the network within specified operating parameters.

6. The system of claim 1, wherein the evaluation of the Quality of service (QoS) operational status and the performance of the remediation action are iteratively performed to detect and remediate a network anomaly, a Quality of service (QoS) issue, or both.

7. The system of claim 1, wherein the Quality of service (QoS) audit engine, the Quality of service (QoS) analytics engine, and Quality of service (QoS) remediation engine are centrally located in a national data center.

8. The system of claim 1, wherein the Quality of service (QoS) audit engine, the Quality of service (QoS) analytics engine, and Quality of service (QoS) remediation engine are implemented in a disaggregated manner in one or more regional data centers.

9. The system of claim 1, wherein the Quality of service (QoS) analytics engine is further configured to evaluate traffic class interface statistics tolerances and calculate new Quality of service (QoS) parameters in response to the traffic class interface statistics violating specified tolerances.

10. The system of claim 1, wherein the Quality of service (QoS) remediation engine is further configured to build a new Quality of service (QoS) configuration policy based on revised parameters, apply a revised Quality of service (QoS) configuration to a corresponding interface, and apply an approved Quality of service (QoS) policy to a corresponding interface.

11. The system of claim 1, wherein the Quality of service (QoS) audit engine is further configured to evaluate an interface configuration, compare an interface description to one or more service function tags, evaluate a Quality of service (QoS) policy for each traffic direction, and determine if an approved Quality of service (QoS) policy matches an applied Quality of service (QoS) policy.

12. A method for managing a network, the method comprising:
   periodically evaluating one or more network devices on a network and evaluating a Quality of service (QoS) policy;
   evaluating a Quality of service (QoS) operational status of the network; and
   automatically implementing a remediation action based on the evaluation of the Quality of service (QoS) operational status of the network and the evaluation of the Quality of service (QoS) policy, the remediation action comprising adjusting a bandwidth allocation and a queue depth for each of a plurality of queues in response to a change in the evaluation of the quality of service (QoS) operational status of the network.

13. The method of claim 12, further comprising commanding a Quality of service (QoS) remediation engine to take corrective action in response to a Quality of service (QoS) analytics engine determining the network is operating in violation of one or more defined Quality of service (QoS) rules.

14. The method of claim 12, wherein the remediation action adjusts an allocated Quality of service (QoS) policy.

15. The method of claim 12, wherein the Quality of service (QoS) operational status is evaluated based on appropriate logic and appropriate rules.

16. The method of claim 12, wherein the Quality of service (QoS) operational status is evaluated by analyzing a real-time interface Quality of service (QoS) queue bandwidth utilization and one or more queue drops.

17. The method of claim 12, wherein the evaluation of the Quality of service (QoS) operational status and the performance of the remediation action are iteratively performed to optimize a performance of the network and maintain the network within specified operating parameters.

18. The method of claim 12, wherein the evaluation of the Quality of service (QoS) operational status and the performance of the remediation action are iteratively performed to detect and remediate a network anomaly, a Quality of service (QoS) issue, or both.

19. The method of claim 12, further comprising evaluating traffic class interface statistics tolerances and calculating new Quality of service (QoS) parameters in response to the traffic class interface statistics violating specified tolerances.

20. The method of claim 12, further comprising building a new Quality of service (QoS) configuration policy based on revised parameters, applying a revised Quality of service (QoS) configuration to a corresponding interface, and applying an approved Quality of service (QoS) policy to a corresponding interface.

21. A non-transitory computer readable medium comprising computer executable instructions which when executed by a computer cause the computer to perform the method of:
periodically evaluating one or more network devices on a network and evaluating a Quality of service (QoS) policy;
evaluating a Quality of service (QoS) operational status of the network; and
automatically implementing a remediation action based on the evaluation of the Quality of service (QoS) operational status of the network and the evaluation of the Quality of service (QoS) policy, the remediation action comprising adjusting a bandwidth allocation and a queue depth for each of a plurality of queues in response to a change in the evaluation of the quality of service (QoS) operational status of the network.

* * * * *